United States Patent Office 3,480,563
Patented Nov. 25, 1969

3,480,563
ORGANIC-SOLUBLE MOLYBDENUM CATALYSTS
Giovanni A. Bonetti, Wynnewood, and Rudolph Rosenthal, Broomall, Pa., assignors to Atlantic Richfield Company, Philadelphia, Pa., a corporation of Pennsylvania
No Drawing. Filed Oct. 25, 1967, Ser. No. 677,874
Int. Cl. B01j *11/32;* C07d *1/08*
U.S. Cl. 252—431           7 Claims

ABSTRACT OF THE DISCLOSURE

Method for the preparation of organic-soluble molybdenum containing catalysts useful for the epoxidation of olefinic compounds by reacting molybdenum trioxide with a monohydric primary saturated acyclic alcohol having from 4 to 22 carbon atoms in the molecule or with a mono- or polyalkylene glycol monoalkyl ether or mixtures thereof and the catalyst prepared by such method.

BACKGROUND OF THE INVENTION

Field of the invention

This invention relates to a method for the preparation of organic-soluble molybdenum-containing catalysts suitable for use in the epoxidation of olefinic compounds wherein an organic hydroperoxide is used as the oxidizing agent and to the catalysts prepared thereby. The method involves reacting molybdenum trioxide with a monohydric primary saturated acyclic alcohol having from 4 to 22 carbon atoms in the molecule or with a mono- or polyalkylene glycol monalkyl ether such as diethylene glycol monomethyl ether or mixtures of such compounds. The field also includes the organic soluble catalysts made by this method.

Prior art

The use of molybdenum-containing catalysts in the epoxidation of olefinic compounds with an organic hydroperoxide as the oxidizing agent is shown in Belgium Patent No. 674,076 dated June 20, 1966. While both inorganic and organic compounds of molybdenum are shown to be effective, the organic-soluble compounds are preferred. By "organic-soluble" is meant catalysts which are soluble in the reaction medium, i.e., in the olefinhydroperoxide mixture.

Since the usual organic-soluble compounds of molybdenum, for example, molybdenum hexacarbonyl or molybdenum oxyacetylacetonate are very much more expensive than molybdenum trioxide, the catalysts of the present invention have a distinct economic advantage over prior art catalysts. They also have the advantage of giving higher conversions in shorter times than are obtainable with molybdenum trioxide itself.

SUMMARY OF THE INVENTION

In accordance with this invention molybdenum trioxide is reacted with one or more $C_4$ to $C_{22}$ monohydric primary saturated acyclic alcohols or with one or more mono- or polyalkylene glycol monoalkyl ethers by heating the molybdenum trioxide with the alcohol or ether or mixtures thereof to produce an organic-soluble molybdenum-containing catalyst. Temperatures in the range of from about 100° C. to 250° C. with reaction times of from 5 minutes to 6 hours can be employed. Somewhat higher temperatures for example 300° C. may be employed with the higher boiling alcohols but in general such higher temperatures are not necessary. As has been stated, "organic-soluble" as used herein refers to catalysts which are soluble in the olefinorganic hydroperoxide reaction mixture.

It is an object of this invention to provide a method for the preparation of organic-soluble molybdenum-containing epoxidation catalysts.

It is another object of this invention to provide organic-soluble molybdenum-containing epoxidation catalysts using molybdenum trioxide as the source of the molybdenum.

It is a further object of this invention to provide a method for the preparation of organic soluble molybdenum containing epoxidation catalysts from molybdenum trioxide and a monohydric primary saturated acyclic alcohol, or a mono- or polyalkylene glycol monoalkyl ether or with mixtures thereof.

Other objects of the invention will be apparent from the following description and from the claims.

DESCRIPTION OF THE PREFERRED EMBODIMENTS

As stated, the instant invention relates to the production of epoxidation catalysts by reacting molybdenum trioxide with a $C_4$ to $C_{22}$ monohydric primary saturated acyclic alcohol or with a mono- or polyalkylene glycol monoalkyl ether. It has been found that molybdenum disulfide reacts only slightly under the reaction conditions of this invention and consequently cannot be used. The other oxides, and other inorganic compounds of molybdenum are too costly to be used in this invention since one of the objectives of this invention is to produce an organic-soluble catalyst which is much less costly than the commonly known organic-soluble molybdenum compounds. Thus, since molybdenum trioxide is one of the least costly compounds of molybdenum and since the disulfide which is comparable in cost is not suitable, molybdenum trioxide is the single preferred compound.

The preferred alcohols are monohydric, primary saturated and acyclic. Secondary saturated acyclic alcohols by themselves are ineffective since they are dehydrated to olefins with molybdenum trioxide under the reaction conditions of this invention. If, however, they are mixed with a predominant amount of primary they are not detrimental. Amounts of secondary alcohols ranging from 10 to 45 percent of a primary-secondary mixture give essentially the same results as obtained with the primary alone. Consequently, since primary alcohols particularly in the higher molecular weight ranges frequently occur in admixture with at least some secondary alcohols, the mixture can be used in the process of this invention. Tertiary alcohols cannot be used in this invention.

The alcohols preferred for use in this invention are saturated, acyclic, monohydric and primary having from 4 to 22 carbon atoms with those having from 6 to 16 being somewhat more preferred. They can be either straight or branched-chain. The $C_{12}$ and higher monohydric primary saturated acyclic alcohols are normally solid compounds, however, under the reaction conditions of this invention, they are liquid.

Examples of the alcohols which can be employed are n-butanol, n-pentanol, hexanol-1, heptanol-1, octanol-1, nonanol-1, decanol-1, undecanol-1, dodecanol-1, tridecanol-1 pentadecanol-1, hexadecanol-1, eicosanol-1, docosanol-1 and the like. Similarly the secondary alcohols such as pentanol-2, hexanol-2, octanol-2 and the like can be admixed with the primary alcohol as has been described. Likewise mixtures of primary alcohols can be employed and are equally effective as the single carbon number compound. Branched chain alcohols such as 2-ethylhexanol-1, 2-methylhexanol-1, 2-ethyloctanol-1, 2-ethyldodecanol-1 and the like also can be used. The unsaturated acyclic alcohols in the $C_4$ to $C_{22}$ range are not preferred since in the subsequent epoxidation reaction they would be epoxidized and would contaminate the epoxide product.

The alkylene glycol monoalkyl ethers are the mono-, di- or trialkylene compounds wherein the alkylene radical contains 2 to 4 carbon atoms. The alkyl group may contain 1 to 6 carbon atoms although 1 to 4 are somewhat more preferred because of their availability. Examples of these compounds which can be used in this invention are ethylene glycol monomethyl ether, diethylene glycol monomethyl ether, triethylene glycol monomethyl ether, propylene glycol monomethyl ether, dipropylene glycol monomethyl ether, butylene glycol monomethyl ether, ethylene glycol monoethyl ether, diethylene glycol monoethyl ether, ethylene glycol monobutyl ether and the like. Mixtures of the ethers may be used and likewise mixtures of the alcohols and ethers may be used.

The preferred reaction temperatures are in the range from 100° C. to 250° C. Higher temperatures can be used but are not advantageous and with the lower alcohols high temperatures require superatmospheric pressures which add to the cost of producing the catalyst. It is particularly convenient to use the atmospheric pressure reflux temperatures of the reaction mixture as the reaction temperature. With increase in temperature shorter reaction times can be used, however, in general times in the range of from 5 minutes to 6 hours are sufficient to produce the soluble molybdenum catalyst.

The amount of molybdenum trioxide used is in the range of from 0.01 weight percent to 5 weight percent of the alcohol or ether, amounts of from 0.05 weight percent to 2 weight percent are somewhat more preferred, although the amount is not extremely critical. There should be enough molybdenum present so that after it has been solubilized there will be sufficient to catalyze the epoxidation reaction. In general, the epoxidation reaction is catalyzed by a molybdenum concentration of from 200 p.p.m. to 700 p.p.m. based on the weight of the reactants.

The following examples are provided for the purpose of illustrating the invention more specifically but they should not be construed as limiting the invention thereto.

EXAMPLE I

Standard run with $Mo(CO)_6$

A mixture of 0.0106 g. $Mo(CO)_6$ (equivalent to 0.00386 g. Mo), 0.9807 g. (95 weight percent purity) of t-butyl hydroperoxide and 4.0064 g. octene-1 was heated at 100° C. for 1 hour. Analysis showed that essentially complete conversion of the hydroperoxide had occurred and that a 92 percent yield of 1,2-epoxyoctane based on hydroperoxide consumed was obtained.

EXAMPLE II

Molybdenum trioxide ($MoO_3$) control test

A mixture of 0.0064 g. $MoO_3$ (equivalent to 0.00426 g. Mo), 0.9615 g. (95 weight percent purity) of t-butyl hydroperoxide and 4.0368 g. octene-1 was heated at 100° C. for 1 hour. Analysis of the product showed that 24 percent of the t-butyl hydroperoxide had reacted and that an essentially quantitative yield of 1,2-epoxyoctane based on the hydroperoxide consumed was obtained. This run shows that very low conversions are obtained with the molybdenum trioxide by itself.

EXAMPLE III $MoO_3$ in octanol-1, octanol-2 mixture

A mixture containing 90 g. octanol-1, 10 g. octanol-2 and 3 g. $MoO_3$ was heated under reflux at 182–188° C. for 4 hours. The mixture was cooled and filtered. The filtrate analyzed 0.73 percent Mo.

To 0.5786 g. of the above filtrate (equivalent to 0.00422 g. Mo), was added 0.9681 g. (95 weight percent purity) of t-butyl hydroperoxide and 4.0003 g. octene-1. After heating for 1 hour at 100° C. analysis showed that essentially all of the t-butyl hydroperoxide had reacted and that an essentially quantitative yield of 1,2-epoxyoctane based on the hydroperoxide consumed was obtained.

EXAMPLE IV $MoO_3$ in octanol-1

To 100 g. octanol-1 was added 0.3 g. $MoO_3$ and the mixture refluxed for 3 hours at 194° C. After cooling and filtering, the filtrate analyzed 0.13 percent Mo.

To 3.3698 g. of the above filtrate (equivalent to 0.00438 g. Mo) was added 0.9718 g. (95 weight percent purity) of t-butyl hydroperoxide and 4.0225 g. octene-1. After heating at 100° C. for 1 hour, analysis showed that essentially all of the t-butyl hydroperoxide had reacted and that a 90 percent yield of 1,2-epoxyoctane based on the hydroperoxide consumed was obtained.

EXAMPLE V $MoO_3$ in hexadecanol-1

A mixture of 50 g. hexadecanol-1 and 3 g. $MoO_3$ was heated at 200° C. to 205° C. for 4 hours. The resulting mixture was filtered hot to prevent solidification of the hexadecanol-1 in the funnel. The cooled filtrate analyzed 0.22 percent Mo.

To 2.1515 g. of the above filtrate (equivalent to 0.00473 g. Mo) was added 0.9687 g. (95 weight percent purity) of t-butyl hydroperoxide and 4.0065 g. octene-1. After heating at 100° C. for 1 hour, analysis showed that essentially complete conversion of the t-butyl hydroperoxide had occurred and that a 95 percent yield of 1,2-epoxyoctane based on the hydroperoxide consumed was obtained.

EXAMPLE VI $MoO_3$ in diethylene glycol monomethyl ether

A mixture of 100 g. diethylene glycol monomethyl ether and 3 g. $MoO_3$ was refluxed at 190° C. for 3 hours. The mixture was cooled and filtered. The filtrate analyzed 0.15 percent Mo.

To 3.1656 g. of the above filtrate (equivalent to 0.00475 g. Mo) was added 0.9621 g. (95 weight percent purity) of t-butyl hydroperoxide and 4.0515 g. octene-1. After heating at 100° C. for 1 hour analysis showed that 70 percent of the t-butyl hydroperoxide had reacted and that a 94 percent yield of 1,2-epoxyoctane based on the hydroperoxide consumed was obtained.

EXAMPLE VII $MoO_3$ in ethylene glycol monomethyl ether

A mixture of 100 g. ethylene glycol monomethyl ether and 3 g. $MoO_3$ was refluxed at 124° C. for 5 hours. The mixture was cooled and filtered. The filtrate analyzed 0.93 percent Mo.

To 0.5451 g. of the above filtrate (equivalent to 0.00507 g. Mo) was added 0.9717 g. (95 weight percent purity) of t-butyl hydroperoxide and 4.0217 g. octene-1. After heating at 100° C. for 1 hour analysis showed that essentially complete conversion of the hydroperoxide had occurred and that an essentially quantitative yield of 1,2-epoxyoctane based on the hydroperoxide consumed was obtained.

EXAMPLE VIII $MoO_3$ in n-butanol

A mixture of 3 g. $MoO_3$ in 100 ml. n-butanol was heated under pressure at 181° C.–182° C. for 30 minutes. After cooling and filtering, the filtrate analyzed 0.31 percent Mo.

To 1.2149 g. of the above filtrate (equivalent to 0.00377 g. Mo.) was added 0.9912 g. (95 weight percent purity) of t-butyl hydroperoxide and 4.0117 g. octene-1. After heating for 1 hour at 100° C. analysis showed that essentially complete conversion of the hydroperoxide had occurred and that a 79 percent yield of 1,2-epoxyoctane based on the hydroperoxide consumed as obtained.

EXAMPLE IX

MoO₃ in ethanol

A mixture of 3 g. MoO₃ in 125 ml. absolute ethanol was heated under pressure at 182° C.–196° C. for 1 hour. After cooling and filtering, the filtrate analyzed 0.071 percent Mo.

To 2.7061 g. of the above filtrate (equivalent to 0.00192 g. Mo) was added 0.5136 g. (95 weight percent purity) of t-butyl hydroperoxide and 2.0425 g. octene-1. After heating at 100° C. for 1 hour analysis showed that 78 percent of the t-butyl hydroperoxide had reacted but the yield of 1,2-epoxyoctane based on hydroperoxide consumed was only 30 percent.

EXAMPLE X

MoS₂ in octanol-1

To 100 g. of octanol-1 was added 5 g. of molybdenum disulfide powder. This mixture was heated to reflux (196° C.) and held at this temperature for 4 hours, then it was cooled and filtered. There was formed less than 25 p.p.m. (0.0025 weight percent) Mo in solution, too small an amount to be useful.

Examples III to VIII inclusive, show that catalysts made in accordance with this invention utilizing alcohols or ethers within the claimed ranges are extremely good epoxidation catalysts giving both high conversions and high yields as good or better than the standard organic-soluble molybdenum catalyst, molybdenum hexacarbonyl. Example III also shows that a mixture of primary and secondary alcohols can be used.

Example VIII shows that superatmospheric pressure can be used with the lower molecular weight alcohols. Example IX using ethanol and superatmospheric pressure (comparable to Example VIII) did not produce a useful catalyst.

Example X shows that moybdenum disulfide cannot be employed as the source of molybdenum instead of molybdenum trioxide.

We claim:
1. The method of preparing organic-soluble molybdenum containing catalysts useful for the epoxidation of olefinic compounds which comprises reacting at a temperature of from about 100° C. to about 250° C., molybdenum trioxide with at least one compound selected from the group consisting of monohydric primary saturated acyclic alcohols having from 4 to 22 carbon atoms in the molecule and mono- or poly-alkylene glycol monoalkyl ethers wherein the alkylene radical contains from 2 to 4 carbon atoms and the alkyl radical contains from 1 to 6 carbon atoms.
2. The catalyst prepared in accordance with the method of claim 1.
3. The method according to claim 1 wherein the monohydric primary saturated acylic alcohol is octanol-1.
4. The method according to claim 1 wherein the monohydric primary saturated acyclic alcohol is admixed with from 10 to 45 weight percent of a monohydric secondary saturated acyclic alcohol.
5. The method according to claim 1 wherein the monohydric primary saturated acyclic alcohol is hexadecanol-1.
6. The method according to claim 1 wherein the compound reacted with the molybdenum trioxide is ethylene glycol monomethyl ether.
7. The method according to claim 1 wherein the compound reacted with molybdenum trioxide is diethylene glycol monomethyl ether.

References Cited

UNITED STATES PATENTS

| 1,133,961 | 3/1915 | Hess. | |
| 2,232,917 | 2/1941 | Hill | 252—431 XR |
| 2,257,009 | 9/1941 | Hill. | |
| 3,434,975 | 3/1969 | Sheng et al. | 252—431 |

PATRICK P. GARVIN, Primary Examiner

U.S. Cl. X.R.

260—348.5, 429